United States Patent
Zweighaft

(10) Patent No.: US 6,614,611 B1
(45) Date of Patent: Sep. 2, 2003

(54) METHOD FOR BUCKLER ROTATION TEST

(75) Inventor: James Zweighaft, Boulder, CO (US)

(73) Assignee: Quantum Corp., Milpitas, CA (US)

( * ) Notice: Subject to any disclaimer, the term of this patent is extended or adjusted under 35 U.S.C. 154(b) by 499 days.

(21) Appl. No.: 09/659,362

(22) Filed: Sep. 12, 2000

(51) Int. Cl.[7] .............................................. G11B 15/18
(52) U.S. Cl. ...................................................... 360/69
(58) Field of Search ........................ 360/69, 71, 72.2, 360/73.3; 242/332.1, 332.4

(56) References Cited

U.S. PATENT DOCUMENTS

| | | | | |
|---|---|---|---|---|
| 5,956,198 A | * | 9/1999 | Kullakowski et al. | ........ 360/71 |
| 6,067,201 A | * | 5/2000 | Shimizu et al. | ................ 360/69 |
| 6,067,203 A | * | 5/2000 | Ottesen et al. | ........... 360/73.03 |
| 6,186,430 B1 | * | 2/2001 | Zweighaft | ................. 242/332.4 |
| 6,307,700 B1 | * | 10/2001 | Takayama | .................. 360/72.2 |
| 6,450,431 B1 | * | 9/2002 | Zweighaft | ................. 242/332.1 |

* cited by examiner

*Primary Examiner*—David Hudspeth
*Assistant Examiner*—Fred F. Tzeng
(74) *Attorney, Agent, or Firm*—Patton Boggs LLP

(57) ABSTRACT

The sensing assembly comprises a microprocessor, a cam, and a position sensor that provide feedback on the disconnection status of a buckle between a takeup leader and a tape cartridge leader. The microprocessor uses the position sensor to detect a first position and a second position of the takeup leader in the tape path. The microprocessor uses the movement between the first position and the second position to determine if the takeup leader and the tape cartridge leader are disconnected prior to ejecting the tape cartridge. The cam permits the load motor operation to be briefly paused during the sensing.

14 Claims, 6 Drawing Sheets

METHOD FOR BUCKLER ROTATION TEST

FIELD OF THE INVENTION

The invention relates to digital tape drive storage devices, and in particular, to a method and apparatus for preventing disconnection failures in a single reel tape drive.

PROBLEM

Digital data is stored on tape drives utilizing a variety of designs, but in all cases, magnetic tape media is wound between a pair of tape reels as data is transferred to or from the tape media. In the art of data storage, the physical space required to store data is an important concern. To conserve space, tape drives often use a single reel tape cartridge design, which utilizes a supply reel located within a removable tape cartridge and a takeup reel located within the tape drive.

After the tape cartridge is inserted into the tape drive, the tape media must be loaded into the tape drive. The loading operation includes connecting the tape media to the takeup reel and winding the tape media to a start point or read position. Various methods have been employed to make this connection. FIG. 1 illustrates one such method wherein the tape media connects to the takeup reel via a buckle 100 between a tape cartridge leader 103 and a takeup leader 101. The tape cartridge leader 103 terminates the tape media at one end and is a strong flexible plastic strip that includes an ovular aperture 102 configured to mate with the takeup leader 101. The takeup leader 101 is a similar strong flexible plastic strip attached at one end to the takeup reel. The opposing end includes a stem 104 and a tab 105 designed to buckle with the ovular aperture 102 on the tape cartridge leader 103. During the buckling operation, a rotating catch connected to a load motor cooperates with a positioning lever to position the takeup leader 101 and the tape cartridge leader 103 for buckling. After the takeup leader 101 and the tape cartridge leader 103 are buckled, the catch is rotated out of the way to a loaded position and the buckle 100 is wound through a tape path until the tape media is in a read position relative to the tape head. Similarly, an unloading operation includes unwinding the takeup leader 101 and tape cartridge leader 103 back past the tape head, rotating the catch back to the unloaded position to disconnect the takeup leader 101 and the tape cartridge leader 103, and ejecting the tape cartridge from the tape drive.

Unfortunately, failures that cause the tape drive to malfunction can occur during the unloading operation. One form of failure, referred to as a disconnection failure, occurs when the catch does not completely rotate back to the unloaded position prior to ejection of the tape cartridge. When this occurs, the buckle between the tape cartridge leader 103 and the takeup leader 101 does not disconnect causing the tape cartridge to become stuck halfway in the tape drive when an ejection is attempted. Following a disconnection failure, the tape drive is rendered inoperable and must be removed from its' enclosure for service. If the tape cartridge is forced out of the tape drive, the tape cartridge leader 103, the takeup leader 101 and/or the tape media are frequently damaged.

Also, unfortunately, this problem is not easily solved without redesigning the entire tape drive. The operation of the catch and the cartridge ejection lever, which retains the tape cartridge in the tape drive, are mechanically tied to a single load motor through a gear train. During operation, the load motor uses a cam to release the catch and allow the catch to rotate from the loaded position to the unloaded position under the force of a first spring. The load motor operation is then continued without interruption until the cam triggers the cartridge release lever and ejects the tape cartridge from the tape drive under the force of a second spring. Under normal operating conditions, the gear train provides the necessary timing to rotate the catch to the unloaded position prior to triggering the cartridge release lever. However, because the speed of the load motor is affected by wear, line voltage, torque constant and other factors, the timing is difficult to maintain. The problem is further compounded by wear in the mechanical components of the catch as well as debris build up at the pivot point that alter the rotation speed of the catch.

SOLUTION

The present invention overcomes the problems outlined above and advances the art by providing a sensing assembly that prevents disconnection failures from rendering the tape drive inoperable. More particularly the sensing assembly detects the status of the tape cartridge leader and takeup leader disconnection prior to ejecting the tape cartridge from the tape drive. If the leaders are not disconnected, the tape drive is automatically reset for a retry operation prior to ejecting the tape cartridge.

Advantageously, the present sensing assembly determines the status of the buckle connection before the tape cartridge is ejected. If the buckle connection is not completely disconnected a retry operation is performed, and the sensing assembly again provides the status of the buckle connection before the tape cartridge is ejected. Only after a positive determination that the buckle connection is disconnected, will the tape cartridge be ejected from the tape drive. Also advantageously, users are pre-warned of required service or pending drive failures before a tape cartridge with important data becomes stuck in the tape drive.

The sensing assembly comprises a microprocessor, a cam, and a position sensor that provide feedback on the disconnection status of the buckle between the takeup leader and the tape cartridge leader. The microprocessor uses the position sensor to detect a first position and a second position of the takeup leader in the tape path. The microprocessor uses the movement between the first and second positions to determine if the takeup leader and the tape cartridge leader are disconnected prior to ejecting the tape cartridge. The cam permits the load motor operation to be briefly paused during the sensing.

DETAILED DESCRIPTION

Figure 1:
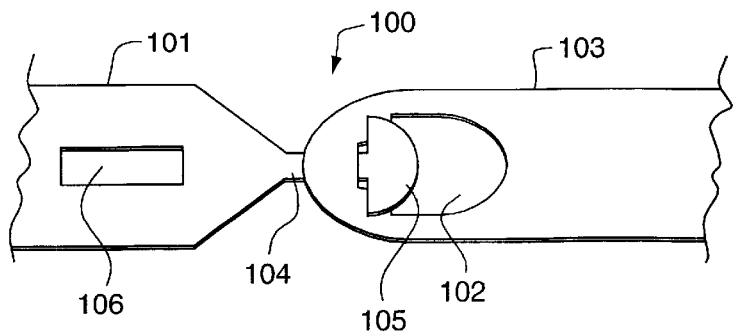
FIG. 1 illustrates an example of a buckle connection.
Figure 2:
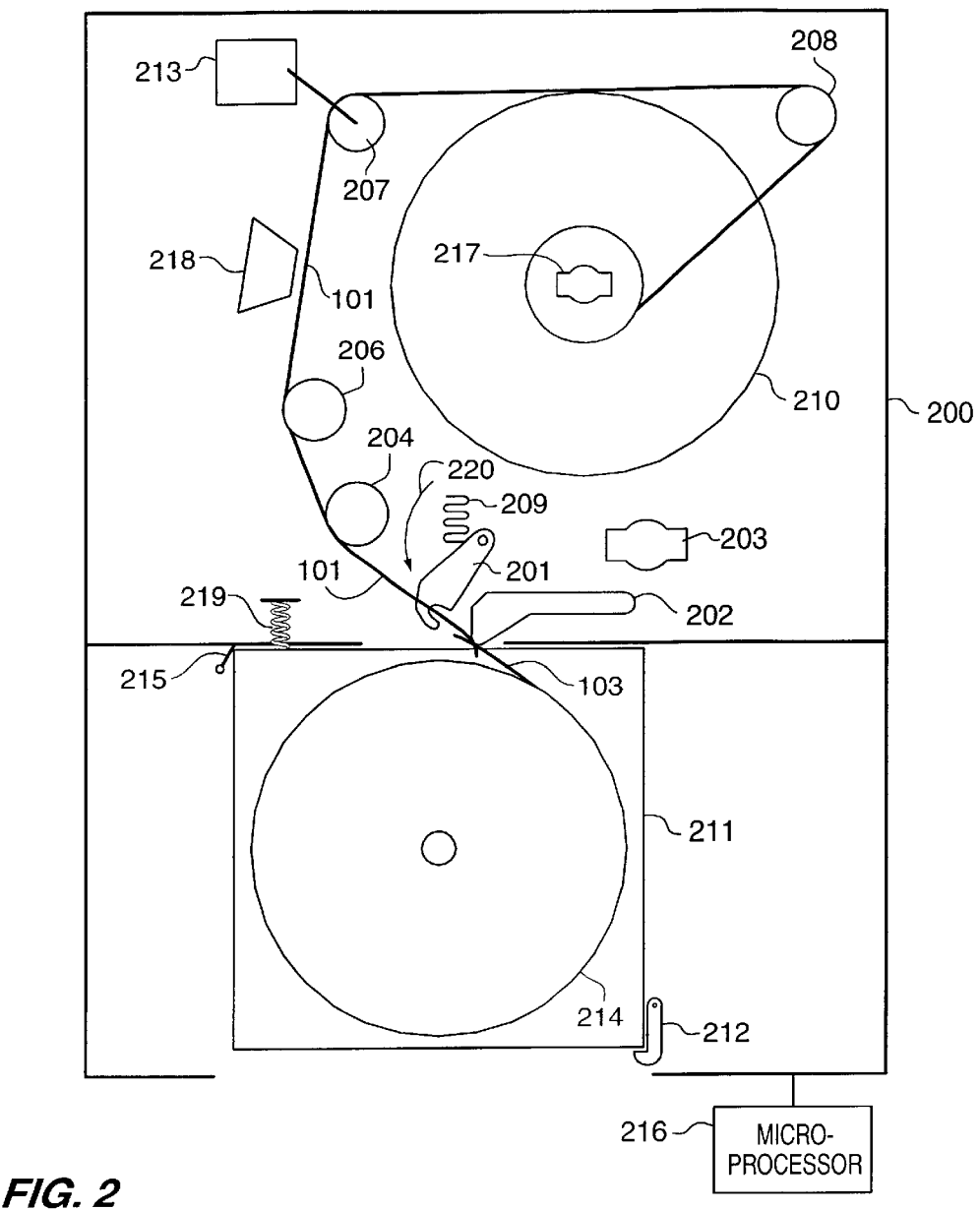
FIG. 2 illustrates an example of a tape drive configured with a sensing assembly according to the present invention.
Figure 3:
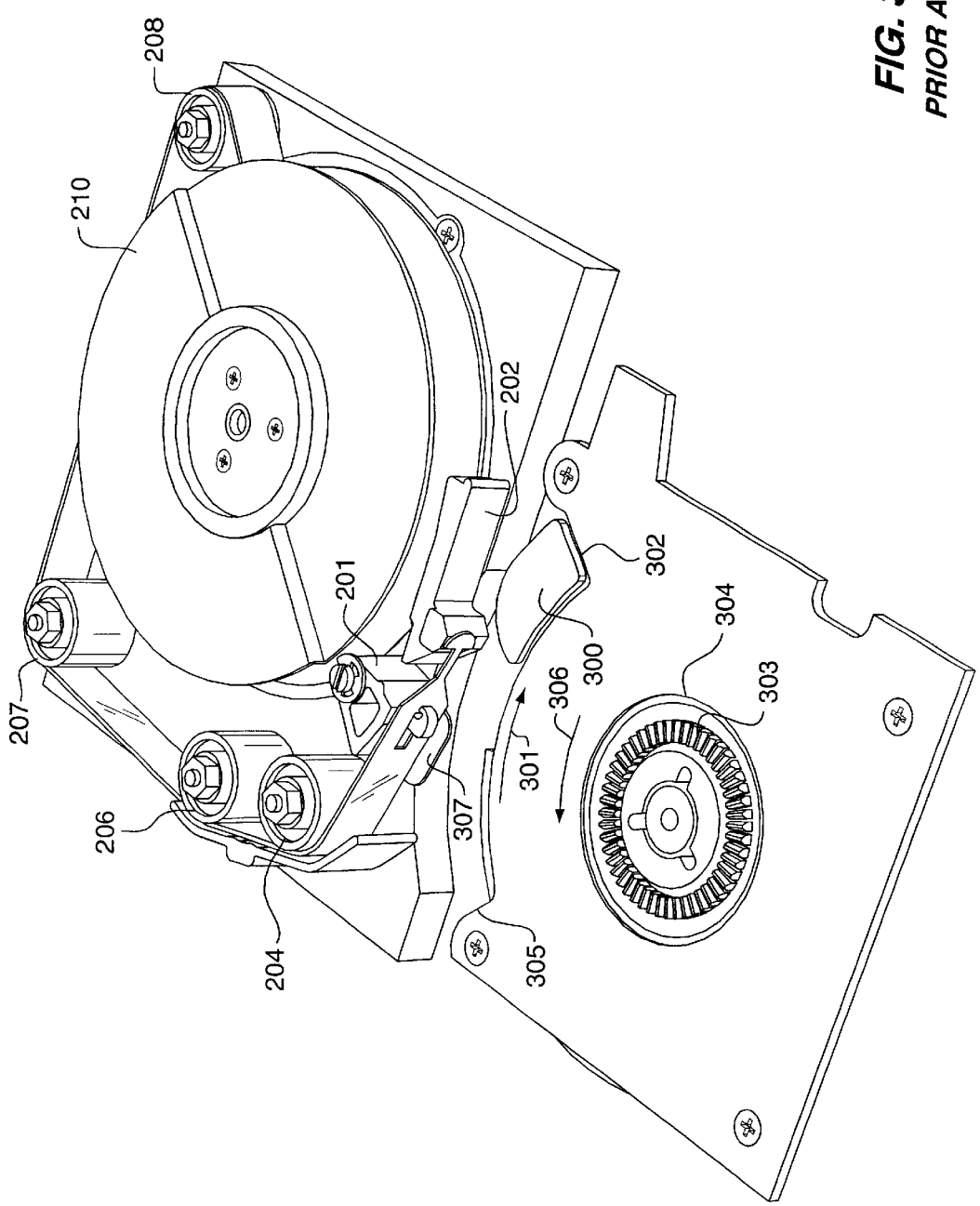
FIG. 3 illustrates an example of a loading and unloading mechanism in a prior tape drive.
Figure 4:
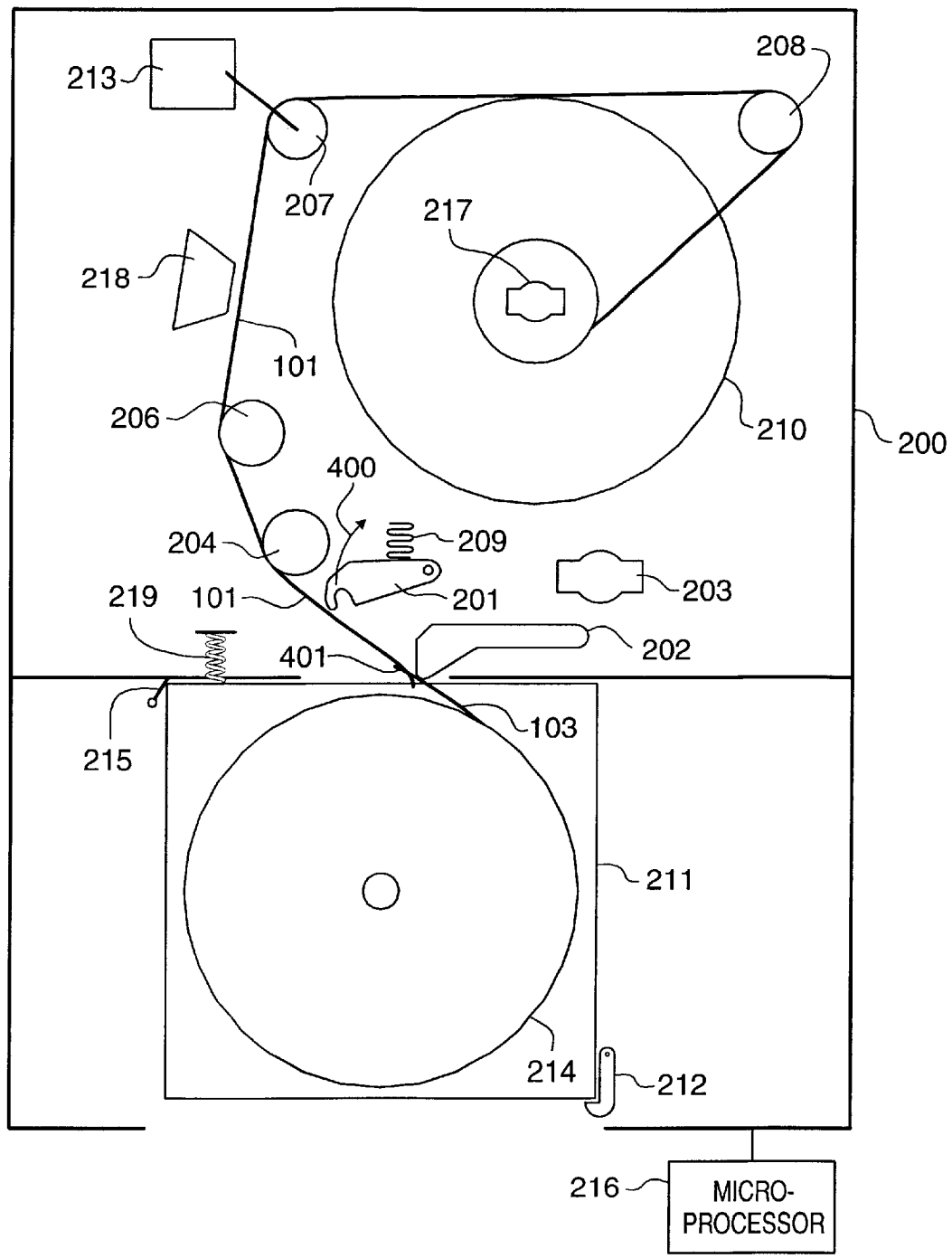
FIG. 4 illustrates another example of a tape drive configured with a sensing assembly according to the present invention.
Figure 5:
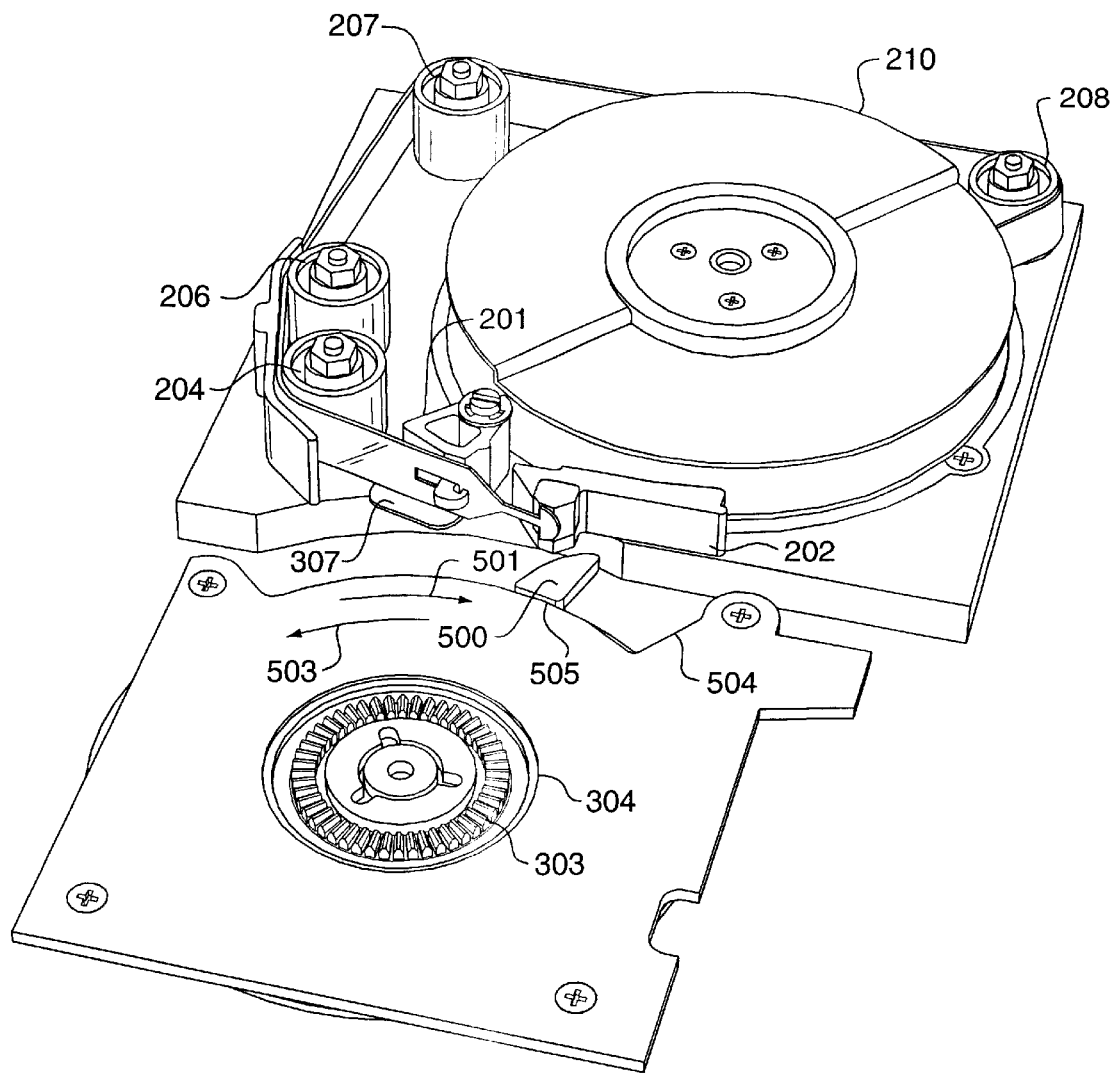
FIG. 5 illustrates an example of a loading and unloading mechanism in a tape drive according to the present invention.
Figure 6:
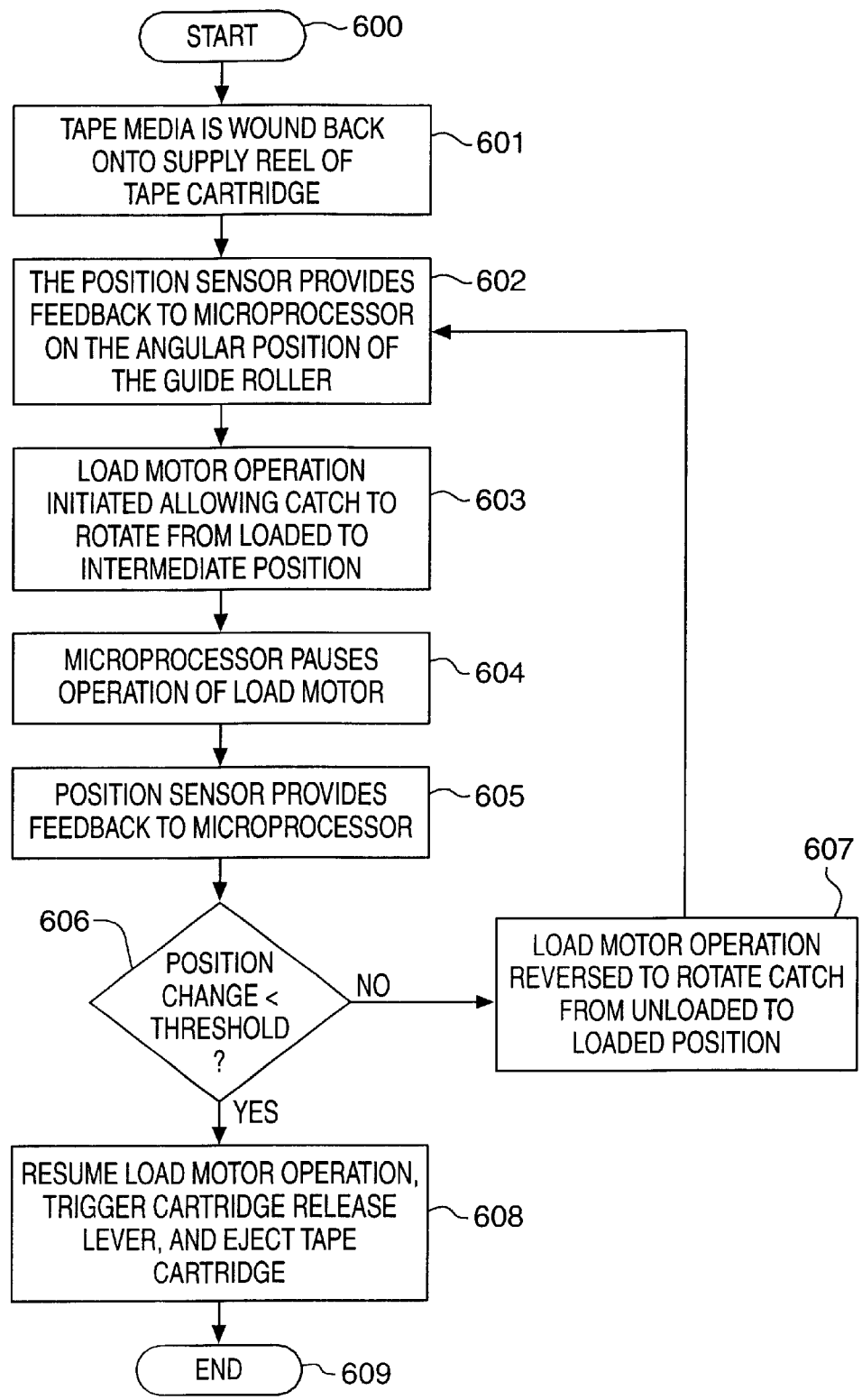
FIG. 6 is a flow chart illustrating an example of the operational steps of a sensing assembly according to the present invention.

The prior art loading and unloading operations:

FIG. 2 illustrates an example of a tape drive in an unloaded condition configured with a sensing assembly according to the present invention. FIG. 3 illustrates an example of a prior art loading and unloading assembly in a tape drive. FIG. 4 illustrates an example of a tape drive in a loaded condition configured with a sensing assembly according to the present invention. FIG. 5 illustrates an example of a loading and unloading mechanism in a tape drive configured with the sensing assembly according to the present invention. FIG. 6 is a flow chart illustrating an example of the operational steps of a sensing assembly according to the present invention.

In the following description of a prior art loading and unloading operation, the tape drives of FIGS. 2 and 4, configured with the sensing assembly of the present invention, are used to illustrate the unloaded and the loaded condition in tape drives. Referring to FIGS. 2, 3 and 4, the tape cartridge loading operation begins when the tape cartridge 211 is inserted into tape drive 200. The tape cartridge 211 houses magnetic tape media wound around a supply reel 214. The tape cartridge leader 103 terminates the magnetic tape media at one end and operates to connect the magnetic tape media to the takeup leader 101. The takeup leader 101 connects to the takeup reel 210 and winds around guide rollers 204, 206, 207, and 208 where it connects to the tape cartridge leader 103.

When the tape cartridge 211 is fully inserted into the tape drive 200, the tape cartridge leader 103 is positioned to buckle with the takeup leader 101 by the positioning lever 202. The loading of the tape cartridge 211 activates the cartridge present switch 215. The microprocessor 216, in response to a signal from the cartridge present switch 215, initiates the connection of the takeup leader 101 and the tape cartridge leader 103 by energizing a takeup motor 217 to bias the takeup-leader 101 firmly on the catch 201. The microprocessor 216 then energizes a load motor 203 to rotate the cam 300 in the direction 306 from the position 302 to the position 305. During the rotation the cam 300 engages the plate 307 on the bottom of the catch 201 to rotate the catch 201 to a loaded position 400, illustrated by FIG. 4. As the catch 201 is rotated to the unloaded position 400, the catch 201 drops out of the aperture 106. The microprocessor 216 then energizes the takeup motor 217 to wind the takeup leader 101 around the takeup reel 210 until the tape media is in a read position relative to the tape head 218. In the loaded position 400, the catch 201 is held compressed against a spring 209 by the cam 300 of FIG. 3. It should be noted that the spring 209 is depicted on the plan views of FIGS. 2 and 4 to illustrate that the catch 201 is returned to the unloaded position 201 by a spring. However, in the perspective views of FIGS. 3 and 5 the spring 209 does not appear as it is integrated into the mounting apparatus of the catch 201 in a conventional manner.

The unloading operation begins with the winding of the tape media back into the tape cartridge 211 until the buckle is in position 401. The microprocessor 216 then operates the load motor 203 to rotate the cam 300 in direction 301 from the position 305 to the position 302. During the rotation, the cam 300 releases the spring loaded catch 201 as the cam 300 disengages the plate 307, allowing the catch 201 to rotate from the loaded position 400 to the unloaded position 220. Toward the end of its rotation, the catch 201 engages the aperture 106 in the takeup leader 101 and pulls the takeup leader 101 slightly forward to release the buckle 100. The catch 201 is stopped in the unloaded position 220 by a hard stop in a conventional manner. During rotation of the catch 201, the load motor 203 drives the cam 300 in direction 301 until cam 300 comes to rest at position 302. At position 302, the cam 300 triggers the cartridge release lever 212 allowing the spring 219 to eject the tape cartridge 211 from the tape drive 200. Unfortunately, if the catch 201 does not completely rotate back to the unloaded position 220 prior to the ejection of the tape cartridge 211 a disconnection failure occurs and the tape cartridge 211 becomes stuck in the tape drive 200 during the ejection. It should be noted that the cam 300 is tied to the tape cartridge clutch 303 so that the clutch 303 disengages the tape cartridge 211 and recedes into aperture 304 as the cam 300 rotates to position 302.

The Sensing Assembly:

Referring to FIGS. 2, 4 and 5, the present sensing assembly comprises a microprocessor 216, a redesigned cam 500, and a position sensor 213, that provide feedback on the position of the takeup leader 101 and the tape cartridge leader 103 during the unloading of a tape cartridge 211 from the tape drive 200. The sensing assembly prevents a disconnection failure from rendering the tape drive 200 inoperable, by repeating the unloading operation until the takeup leader 101 and the tape cartridge leader 103 are disconnected, before the tape cartridge 211 is ejected from the tape drive 200. The unloading operation could be repeated any number of times as a matter of design choice and individual tape drive characteristics.

In operation, the microprocessor 216 uses the position sensor 213 to detect the amount of movement realized at guide roller 207 during the unloading operation. The microprocessor 216 uses a position difference between a first position 505 and a second position 504 to determine if the catch 201 has completed its rotation to a position where the takeup leader 101 is disconnected from the tape cartridge leader 103 for ejection of the tape cartridge 211. The cam 500 prevents the tape cartridge 211 from being ejected from the tape drive 200 during the sensing and subsequent retry operations where applicable. The cam 500 is connected to the cartridge release lever 212 and will not activate the cartridge release lever 212 until the sensing assembly confirms the takeup leader 101 and tape cartridge leader 103 are disconnected.

Those skilled in the art will appreciate numerous variations in sensing configuration and operation that are within the scope of the present sensing assembly. For example it will become apparent from the following description that the position sensor 213 could be used to detect position differences at numerous locations within the tape drive 200 to determine if the takeup leader 101 and the tape cartridge leader 103 are disconnected. Some examples of locations include without limitation, one of guide rollers 204, 206, or 208 or the takeup reel 210.

Sensing Assembly Operation:

FIG. 6 is a flow chart illustrating the operation of a sensing assembly according to the present invention. The operation begins at step 600. At step 601 the tape media is wound back onto the supply reel 214 until the buckle 100 is in position 401. At step 602 the position sensor 213 provides feedback to the microprocessor 216 on the angular position of the guide roller 207. At step 603 the microprocessor 216 initiates operation of the load motor 203, which drives a gear train (not shown) to rotate the cam 500 and release the spring loaded catch 201 by disengaging the plate 307. The spring 209 gradually rotates the catch 201 against the cam 500 from the loaded position 400 to the unloaded position 220 as the cam 500 rotates in direction 501. Toward the end of its rotation, the catch 201 engages the aperture 106 in the takeup leader 101, and pulls the takeup leader 101 slightly forward onto the position lever 202, as illustrated by FIG. 5, until the catch 201 is stopped by the hard stop in the tape drive 200. The load motor operation is continued during the rotation of the catch 201 to move the cam 500 in direction 501 until the cam passes beyond the stopped position of the rotating catch 201 to intermediate position 505. At step 604 the microprocessor 216 pauses the operation of the load motor 203 at position 505. This prevents the cam 500 from triggering the cartridge release lever 212, while allowing the catch 201 to finish its rotation from the loaded position 400 to the unloaded position 220. In alternative examples, the load motor operation could be paused at any point after the cam 500 has cleared the path of the rotating catch 201, but before the cartridge release lever 212 is triggered.

At step 605 the position sensor 213 again provides feedback to the microprocessor 216 on the angular position of the guide roller 207. If the catch 201 has completed its rotation, properly engaged the takeup leader 101, and moved the takeup leader 101 slightly forward onto the position lever 202, the guide roller 207 will have rotated in a counterclockwise direction with the movement of the takeup leader 101 onto the position lever 202. The microprocessor 216 compares the change in angular position of the guide roller 207 with a threshold to determine if the takeup leader 101 has been moved by the catch 201. The threshold defines the amount of takeup leader movement necessary to position the takeup leader 101 so that the tab 105 will disconnect from the aperture 102 in the tape cartridge leader 103 when the tape cartridge 211 is ejected. If the change in position is equal to or greater than the threshold at step 606, the load motor operation is resumed to rotate the cam 500 to position 504, trigger the cartridge release lever 212, and eject the tape cartridge 211, at step 608. The operation then ends at step 609. If the change in position is smaller than the threshold, indicating that the catch 201 has not moved the takeup leader 101 far enough, or not at all, the microprocessor 216 resets for a retry operation at step 606 and the operation continues at step 607.

At step 607, the microprocessor 216 reverses the operation of the load motor 203 to reverse the direction of the cam 500 and rotate the catch 201 back to the loaded position 400. Steps 602 through 605 are then repeated during the retry operation. Steps 602 through 605 could be repeated any number of times as a matter of design choice for individual tape drive formats. If all attempts to disconnect the takeup leader 101 and the tape cartridge leader 103 are unsuccessful, the microprocessor 216 could indicate to the user through a service light or other type of message, that the tape drive 200 requires service.

Advantageously, the tape cartridge 211 is not ejected from the tape drive 200 while the takeup leader 101 and the tape cartridge leader 103 are still connected. Thus, users of the tape drive 200 are not tempted to force tape cartridges out of the tape drive 200 and damage the takeup leader 101 or the tape cartridge leader 103. Also advantageously, in most scenarios, only a single retry operation is necessary to accomplish the disconnection of the takeup leader 101 and tape cartridge leader 103 following a failed disconnection operation. Thus, users are able to remove tape cartridges from the tape drive 200 for use while the tape drive 200 is serviced.

Figure 7:
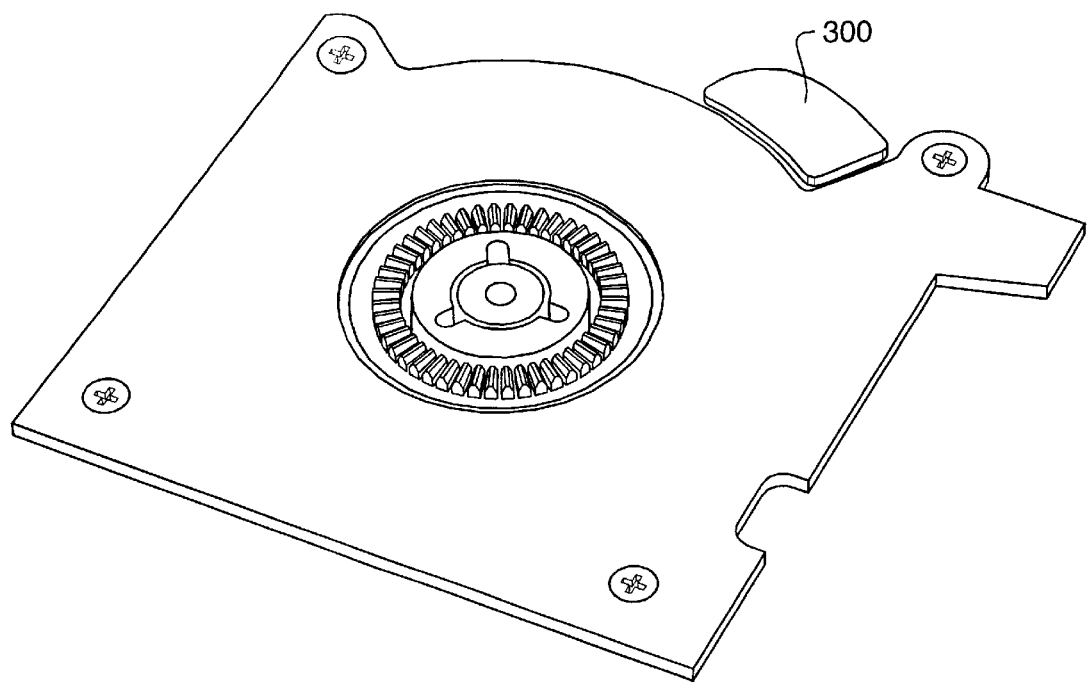
FIG. 7 is a prior art cam for a prior art tape drive.
Figure 8:
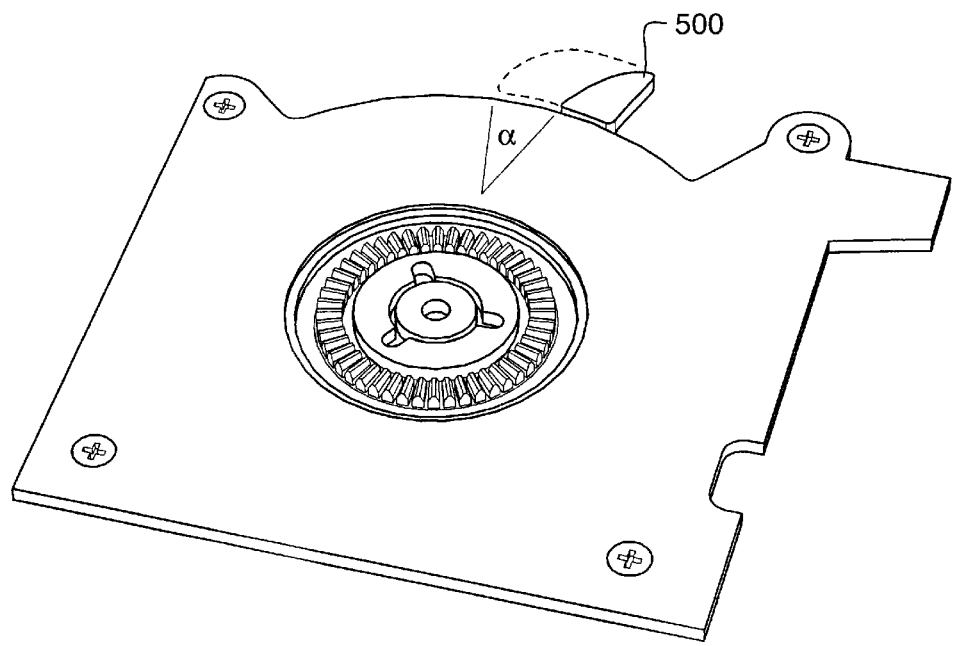
FIG. 8 is an example of a cam for the sensing assembly according to the present invention.

The Cam:

Referring to FIGS. 7 and 8, the substantially smaller size of the cam 500, compared to the prior art cam 300, permits the load motor 203 to be paused at the position 505 after the cam 500 has passed beyond the stopped position of the rotating catch 201, but before the cam 500 reaches position 504 and releases the cartridge release lever 212. Unfortunately, the larger size of the prior art cam 300 causes the prior art cam 300 to trigger the cartridge release lever 212 before the load motor 203 can be paused. Those skilled in the art will appreciate that the cam 500 could be constructed in any size that allows the load motor 203 to be briefly paused before releasing the cartridge release lever 212. In one preferred example the size of the cam 500 is reduced by 17 degrees as illustrated on FIG. 8 by angle α.

Those skilled in the art will appreciate that the sensing assembly of the present invention could also benefit tape drive models not rendered inoperable by disconnection failures. Advantageously, the sensing assembly provides immediate feedback that warns the user of potential problems with the tape drive 200 and could be utilized to provide feedback on other internal tape drive problems.

The above-described microprocessor can include instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the microprocessor to direct the microprocessor to operate in accord with the invention. The term "microprocessor" refers to a single processing device or a group of inter-operational processing devices. Some examples of devices are integrated circuits and logic circuitry. Those skilled in the art are familiar with instructions, microprocessors, and storage media.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for disconnecting a takeup leader connected to a takeup reel in a single reel tape drive, and a tape cartridge leader connected to a magnetic tape media contained on a supply reel in a single reel tape cartridge that is loadable into the tape drive, the method comprising:

winding the tape media around the supply reel until the takeup leader and the tape cartridge leader are in a position for disconnection;

responsive to winding the tape media around the supply reel to the position for disconnection, sensing a first position of the takeup leader in a tape path;

performing an unload operation to disconnect the takeup leader from the tape cartridge leader;

sensing a second position of the takeup leader in the tape path, which results from the unload operation;

comparing the first position and the second position to determine a position difference; and using the position difference to determine if the takeup leader and the tape cartridge leader are disconnected prior to ejecting the tape cartridge.

2. The method of claim 1, the method further comprising:

responsive to a determination that the takeup leader and the tape cartridge leader are disconnected, ejecting the tape cartridge from the tape drive; and responsive to a determination that the takeup leader and the tape cartridge leader are not disconnected, resetting the tape drive to retry the unload operation.

3. The method of claim 1 wherein the step of sensing the first position of the takeup leader in the tape path comprises:

sensing a first angular position of a guide roller in the tape path; and the step of sensing the second position of the takeup leader in the tape path comprises:

sensing a second angular position of the guide roller in the tape path.

4. The method of claim 1, wherein the step of performing the unload operation comprises:

responsive to sensing the first position of the takeup leader, operating a load motor to trigger rotation of a catch;

rotating the catch from a loaded position to an unloaded position while continuing operation of the load motor, wherein the catch engages the takeup leader during the rotation from the loaded position to the unloaded position; and responsive to engaging the takeup leader with the catch, moving the takeup leader in a forward direction relative to the tape cartridge leader to disconnect the takeup leader from the tape cartridge leader.

5. The method of claim 4 wherein the step of performing the unload operation further comprises:

responsive to rotating the catch from the loaded position to the unloaded position, pausing the load motor operation; and responsive to a determination that the takeup leader and the tape cartridge leader are disconnected, restarting the load motor operation to eject the tape cartridge.

6. The method of claim 4, wherein the step of resetting the tape drive for the retry operation comprises:

operating the load motor to rotate the catch from the unloaded position to the loaded position.

7. A sensing assembly for determining if a takeup leader connected to a takeup reel in a single reel tape drive, and a tape cartridge leader connected to a magnetic tape media contained on a supply reel in a single reel tape cartridge that is loadable into the tape drive, are disconnected prior to ejecting the tape cartridge, the assembly comprising:

means for winding the tape media around the supply reel until the takeup leader and the tape cartridge leader are in a position for disconnection;

means for sensing a first position of the takeup leader in a tape path when the takeup leader and the tape cartridge leader are in the position for disconnection;

means for disconnecting the takeup leader from the tape cartridge leader;

means for sensing a second position of the takeup leader in the tape path, which results from the disconnecting means operation;

means for comparing the first position and the second position to determine a position difference; and means for using the position difference to determine if the takeup leader and the tape cartridge leader are disconnected.

8. The sensing assembly of claim 7, further comprising:

means for ejecting the tape cartridge from the tape drive responsive to a determination that the takeup leader and the tape cartridge leader are disconnected; and means for resetting the tape drive to retry disconnecting the takeup leader from the tape cartridge leader responsive to a determination that the takeup leader and the tape cartridge leader are not disconnected.

9. The sensing assembly of claim 8, wherein the disconnecting means comprises:

a load motor coupled to a cam; and a catch;

wherein the load motor is configured to trigger a rotation of the catch from a loaded position to an unloaded position using the cam, and the catch is configured to engage the takeup leader during the rotation to move the takeup leader in a forward direction relative to the tape cartridge leader to disconnect the takeup leader from the tape cartridge leader.

10. The sensing assembly of claim 9 wherein the disconnecting means further comprises:

a microprocessor configured to initiate operation of the load motor to trigger the rotation of the catch and configured to pause the operation of the load motor responsive to the rotation of the catch to the unloaded position.

11. The sensing assembly of claim 10 wherein the means for sensing the first position of the takeup leader and the means for sensing the second position of the takeup leader comprises:

a position sensor coupled to a guide roller, wherein the position sensor is configured to provide the first position and the second position information to the microprocessor.

12. The sensing assembly of claim 11 wherein the microprocessor is configured to use the position difference to determine if the takeup leader is disconnected from the tape cartridge leader.

13. The sensing assembly of claim 12 wherein the microprocessor is configured to restart the load motor operation to eject the tape cartridge responsive to the determination that the takeup leader and the tape cartridge leader are disconnected.

14. The sensing assembly of claim 12 wherein the microprocessor is configured to reverse the load motor operation to rotate of the catch from the unloaded position back to the loaded position responsive to the determination that the takeup leader and the tape cartridge leader are not disconnected.

* * * * *